United States Patent

[11] 3,626,021

[72] Inventors Glenn O. Michaels
South Holland;
John Mooi, Homewood; LaVern H. Beckberger, Harvey, all of Ill.
[21] Appl. No. 741,323
[22] Filed July 1, 1968
[45] Patented Dec. 7, 1971
[73] Assignee Atlantic Richfield Company
Continuation of application Ser. No. 445,778, Apr. 5, 1965, now abandoned. This application July 1, 1968, Ser. No. 741,323

[54] DEHYDROGENATION OF ALIPHATICS OVER ALKALI METAL OXIDE-CHROMIA-ZINC ALUMINATE SPINEL CATALYST
10 Claims, No Drawings
[52] U.S. Cl. .................................................. 260/683.3,
252/465, 252/468, 260/680 R
[51] Int. Cl. .......................................................... C07c 5/18,
C07c 3/28, B01j 11/22
[50] Field of Search............................................ 260/683.3;
252/468, 465

[56] References Cited
UNITED STATES PATENTS
| 2,447,017 | 8/1948 | Kearby | 260/673.5 |
|---|---|---|---|
| 2,754,345 | 7/1956 | Kirshenbaum | 260/683.3 |
| 3,126,426 | 3/1964 | Turnquest et al. | 260/683.3 |
| 3,168,587 | 2/1965 | Michaels et al. | 260/683.3 |
| 3,310,599 | 3/1967 | Haensel et al. | 260/683.3 |
| 3,315,008 | 4/1967 | Abell et al. | 260/683.3 |
| 1,271,013 | 7/1918 | Bosch et al. | 260/683.3 |
| 2,172,534 | 9/1939 | Grosse | 260/683.3 |
| 2,257,082 | 9/1941 | Yarnall | 260/683.3 X |
| 2,397,352 | 3/1946 | Hemminger | 260/683.3 |
| 3,189,661 | 6/1965 | Mulasky et al. | 260/683.3 X |
| 3,363,023 | 1/1968 | Mooi et al. | 260/683.3 |

Primary Examiner—Delbert E. Gantz
Assistant Examiner—G. E. Schmitkons
Attorneys—John W. Behringer, Eugene L. Bernard, Martin J. Brown, James N. Dresser, W. Brown Morton, Jr., John L. Roberts and Malcolm L. Sutherland ABSTRACT: Branched chain, aliphatic hydrocarbons of five to 10, preferably five to eight, carbon atoms, with the longest continuous carbon-to-carbon chain being four or five carbons long, are dehydrogenated with the aid of a catalyst composition consisting essentially of zinc aluminate spinal, chromia and alkali metal oxide. Vapor phase conditions are employed, including a temperature of about 900° to 1250° F. The dehydrogenation proceeds with a minimum of skeletal isomerization to yield an olefinically unsaturated product having the same skeletal carbon atom arrangement as the hydrocarbon being dehydrogenated. Thus, for example, using the catalyst of the invention neohexane can be dehydrogenated to neohexene in high yields and with a minimum of byproducts.

DEHYDROGENATION OF ALIPHATICS OVER ALKALI METAL OXIDE-CHROMIA-ZINC ALUMINATE SPINEL CATALYST

This application is a continuation-in-part of copending application Ser. No. 445,778, filed Apr. 5, 1965 now abandoned.

This invention relates to the dehydrogenation of hydrocarbons and more particularly to such dehydrogenation of hydrocarbons in the presence of a novel catalyst.

Chromia-alumina catalysts have long been used commercially for the dehydrogenation of paraffinic compounds to form olefins and/or diolefins. Quite frequently the system uses a catalyst containing from 10 to 20 percent $Cr_2O_3$ carried on a high surface area support such as activated alumina. Commonly, small amounts of alkali metal oxides are added to neutralize the acid sites on the catalyst to minimize cracking and isomerization reactions. These catalysts have been used in such processes as the production of butenes and butadiene from n-butane, isoprene from isopentane or isoamylenes, styrene from ethyl benzene and a number of similar dehydrogenation reactions. It is characteristic of these reactions, however, that as the number of carbon atoms in the reactant material is increased above four the material becomes increasingly more difficult to dehydrogenate without producing large amounts of less desirable byproducts. The greater chain length increases the possibility of cracking of the reactant to lighter materials as well as the possibility of skeletal isomerization. It thus becomes increasingly more important with the higher molecular weight materials to use catalysts which are adapted to a specific reaction or group of reactions.

We have found that whereas chromia-alumina catalysts may be used advantageously for the dehydrogenation of n-butane they become much less selective with branched chain $C_5$, $C_6$ and higher hydrocarbons. In particular, the dehydrogenation of neohexane over $Cr_2O_3$—$Al_2O_3$ catalysts results in a large amount of isomeric $C_6$ olefins or diolefins other than the desired alpha-olefin, i.e., 3,3-dimethylbutene-1, also known as neohexene. It is generally felt that the isomerization of the neohexene to other $C_6$ olefins over these catalysts is the reaction which limits the yield of neohexene to values far below the equilibrium amounts expected. A number of commercial and exploratory $Cr_2O_3$—$Al_2O_3$ catalysts have been tested but in every case large amounts of these undesirable byproducts have been formed.

It has now been discovered that the vapor phase dehydrogenation of certain aliphatic hydrocarbons in the presence of the novel catalyst of this invention considerably minimizes skeletal isomerization so that higher yields and selectivities of the desired product are obtained. The catalyst of the present invention consists essentially of zinc aluminate spinel, chromia and alkali metal oxide. The amount of the zinc aluminate will usually be sufficient to provide in the range of about 5 to 50 percent of zinc (calculated as the free metal), preferably about 10 to 32 percent, based on the weight of the catalyst. Stoichiometrically, the amount of ZnO in zinc aluminate is about 44.3 weight percent. A Zn content of about 32 percent provides a ZnO concentration of about 40 percent.

The amount of chromia (calculated as $Cr_2O_3$) can also vary widely and will usually be in the range of at least about 1, or even 5, to about 40 percent, preferably about 10 to 30 percent, based on the weight of the catalyst.

The amount of alkali metal oxide present in the catalyst is important, as too little alkali metal oxide does not prevent isomerization and too much causes increased coke yields and lower activity. Acceptable results are usually obtained when about 0.1 to 4 percent, preferably about 0.1 to 2 percent, by weight of the catalyst, of alkali metal oxide (calculated as the free alkali metal) is present in the catalyst. Thus, for example, where the alkali metal oxide is sodium oxide ($Na_2O$) there will usually be present in the catalyst about 0.27 to 8.8, preferably about 0.27 to 4.4, weight percent of the sodium oxide (calculated as $Na_2O$). It should be appreciated, however, that the most advantageous level of alkali metal oxide may vary from catalyst to catalyst and for best results should be determined in every specific case. The preferred alkali metal oxide is sodium oxide, but other alkali metal oxides, e.g., the oxides of lithium, potassium, cesium and rubidium, can also be used.

The support or base component of the catalyst composition of this invention is the zinc aluminate spinel. A preferred method of making the zinc aluminate support material is described in example I below. The base may also contain minor amounts of other solid oxides.

Impregnation of the spinel base with the catalytrically active metal components can be by known methods. For instance, the base can be mixed with an aqueous solution of a water-soluble salt of the catalytically active components of the invention to absorb all or part of the solution in the support which is then dried and calcined, for instance at about 750° to 1500° F., preferably about 850° to 1400° F., to give an active catalyst. Alternatively, the active components can be precipitated on the support through neutralization of a slurry of the support and water-soluble compounds of the catalytically active metals and then drying and calcining. Calcining activates the catalyst and, if not already present as the oxides of chromium and alkali metal, may convert the catalytically active metal components to their oxide forms. The impregnation with the catalytically active components can be done separately or simultaneously.

If desired, the spinel base can be ground before addition of the catalytic metals, and the resulting material formed, if desired, into larger particles, impregnated and dried, before effecting the calcination which gives the final catalyst. Alternatively, the base particles can be directly impregnated, dried and calcined; or directly impregnated, ground and formed into shaped particles by tabletting or extrusion and then recalcined. It is preferred to calcine the base material prior to addition of the catalytically-active components. After the catalytically active components are added to the base, the resulting catalyst composition are added to the base, the resulting catalyst composition can be activated by drying and calcination, for instance, at the temperatures noted above.

The hydrocarbon feeds of the present invention are aliphatic, branched chain hydrocarbons of five to 10, preferably five to eight carbon atoms, the longest continuous carbon-to-carbon chain of which contains four to five carbon atoms. They are dehydrogenated by the process of the present invention to yield olefinically unsaturated hydrocarbons having the same skeletal carbon atom arrangement as the feed hydrocarbon. Saturated as well as mono-olefinically unsaturated feeds can be employed, provided their carbon atom and bonding arrangements are such that they are theoretically capable of being dehydrogenated without being rearranged. Preferably, they will contain no acetylenic unsaturation. Thus, most preferred for this dehydrogenation reaction are hydrocarbon feeds such as isopentane, methylbutenes, dimethylbutanes, dimethylbutenes, trimethylbutane, methylpentanes, dimethylpentanes, methylpentenes, dimethylpentenes, trimethylpentanes, trimethylpentenes, etc. As suitable reactions, for example, may be mentioned the conversion of neohexane to neohexene, the conversion of isopentane to isoprene, and the conversion of isooctane (2,2,4-trimethylpentane) to diisobutylene (isomeric mixture of 2,4,4-trimethylpentene-1 and 2,4,4-trimethylpentene-2). The catalyst has been found to be especially useful for the dehydrogenation of those feeds which contain a quaternary (i.e., "neo") carbon atom. It is especially selective for the conversion of neohexane to heohexene.

In accordance with the process of the present invention the hydrocarbon to be dehydrogenated is contacted under dehydrogenation conditions with the novel catalyst. The dehydrogenation process is conducted in the vapor phase under an elevated temperature, for instance about 900° to 1250° F., preferably about 925° or 950° to 1050° or 1100° F., and usually a hydrocarbon pressure of less than about 2 atmospheres is employed. Generally, increased selectivities are obtained at hydrocarbon pressures below atmospheric, say down to about 0.05 atmosphere or below with a hydrocarbon pressure of about 0.1 to 0.5 atmosphere being preferred for economic reasons. If desired, an inert diluent or vacuum can be employed to reduce the hydrocarbon partial pressure of the hydrocarbon feed. Various essentially inert gaseous diluents can be employed but it is preferred to use nitrogen, hydrogen, or methane. The inert gas is usually present in an amount of about 0.5 to 50 moles, preferably about 5 to 25 moles, per mole of hydrocarbon feed. The contact time or weight hourly space velocity will vary depending on the temperature and pressure employed but will generally range from about 0.1 to 5, preferably 0.25 to 1.0, WHSV.

The following examples are included to further illustrate the catalyst and process of the present invention.

EXAMPLE I

A catalyst support consisting essentially of zinc aluminate spinel was first prepared as follows: 453 g. of sodium aluminate (42.9 percent $Al_2O_3$, 30.6 percent $Na_2O$) was dissolved in deionized water, filtered, and diluted to 1 liter. 568 g. of $Zn(NO_3)_2 \cdot 6H_2O$ was dissolved in deionized water, 45 ml. of concentrated $HNO_3$ was added, and the solution was diluted to 1 liter. The two solutions were run simultaneously into 2 liters of deionized water stirred rapidly in a 3 gal. polyethylene container. The solutions were added at equal rates such that the addition required 20 min. When the addition was about one-fourth complete 3 liters more of deionized water were added to thin the precipitate. The precipitate was stirred for 1 hr. after the addition was complete and then filtered. The cake was washed repeatedly by slurrying in 4 liters of ammonium carbonate solution (1 g./liter), and filtering. Six washes were required before a negative sodium test was obtained on the filtrate. The washed cake was then dried in a force air-drying oven at about 230° F. and ground with a mortar and pestle to pass 20 mesh. The powder was mixed with 4 percent HM Sterotex and tabletted one-eighth in. diameter × one-sixteenth in. length using a Stokes 16 punch tablet press. The tablets were calcined in a muffle furnace programmed to heat to 1050° F. at about 200° F./hr. and then maintain 1050° F. for 3 hrs. Analysis of the calcined material showed 2.03 percent volatile at 1000° C., 29.9 percent ZnO and 70.0 percent $Al_2O_3$ (Spl. No. 900-5085). X-ray diffraction analysis indicated a spinel phase and did not reveal the presence of any uncombined alumina in the calcined material. Apparently, then, the excess alumina is in some manner bonded to, or incorporated within, the spinel. 228 g. of the calcined tablets were vacuum impregnated with 90 ml. of a solution made up by dissolving 76 g. of $CrO_3$, 2.3 g. of NaOH and 25.5 ml. concentrated $NH_4OH$ in deionized water to make 180 ml. The impregnated tablets were transferred to a 12×18 in. Pyrex tray, dried for about 3½ hrs. in a forced-air drying oven at about 230° F., and calcined in a muffle furnace at 900° F. The tablets were then impregnated in the same manner as before with the remaining 90 ml. of solution. The tablets were dried in the forced air-drying oven at 230° F. and calcined in a tube furnace at 1400° F. for 5 hrs, in 20 percent steam-air and 1 hr. in dry air at atmospheric pressure. 277 g. of catalyst was recovered. Sample No. 900-947-5086. Analysis: 0.63 percent volatile at 1000° C., 21.0 percent $Cr_2O_3$, and 0.304 percent Na.

EXAMPLE II L 1000 g. of aluminum hydroxide (Bayerite), 90 g. of zinc oxide, 3.5 g. of starch and 3.5 g. of methyl cellulose were mixed dry in a Simpson Intensive Mixer. A solution of 257 g. of $Al(NO_3)_3 \cdot 9H_2O$ in 154 ml. of deionized water was added to the mix in small portions with short periods of mixing between additions. Mixing was continued for about three-fourths hr. after the final addition. The resulting dough was extruded, one-sixteenth in. diameter, with a Welding Engineer's twin-worm extruder. The extrudate was dried in a forced air-drying oven cooled, and broken to less than three-eighth in. lengths. Fines were removed through a 14 mesh screen. The extrudate was then calcined in a muffle furnace programmed to heat to 600° F. at 30° F./hr., from 600–1050° F. at about 100° F./hr. and then maintain 1050° F. for 3 hours. 192 g. of the calcined extrudate was vacuum impregnated with a solution of 62.3 g. of $CrO_3$, 1.9 g. of NaOH and 21 ml. of con. $NH_4OH$ in deionized water to make 115 ml. The extrudate was held in contact with the solution for about 1½ hrs. and was then transferred to a 12×13 in. Pyrex tray and placed in a forced air-drying oven. The oven-dry catalyst was calcined in a tube furnace at 1400° F. for 5 hrs. in a flowing atmosphere of about 20 percent steam-80 percent air and then for 1 hr. in flowing dry air. 232 g. of catalyst were recovered. Analysis: 1.60 percent volatile at 1000° C., 17.1 percent $Cr_2O_3$, 0.202 percent Na, 9.67 percent ZnO (Spl. No. 900-5115).

EXAMPLE III

A portion of the catalyst of example I (identified as 900-947-) was charged to a 1 inch Universal Reactor and used for the conversion of neohexane to neohexene. The catalyst was raised to operating temperature in a slow stream of nitrogen. Pure grade neohexane was then introduced to the reactor without any further pretreat of the catalyst. After each run, the reactor was purged 15 minutes with $N_2$ and the coke burned off from the catalyst with an air-$N_2$ mixture. Maximum temperature during regeneration was held to 1100° F. for comparison, runs were made using a commercial catalyst A, composed approximately of 20 weight percent $Cr_2O_3$ and 0.2 weight percent Na (as sodium oxide) on alumina, and also using the nonspinel catalyst of example II. The reaction conditions and the results are shown in tables I and II.

TABLE I
[Feed, Pure Grade Neohexane]

| | Catalyst of | | | | | | | | |
|---|---|---|---|---|---|---|---|---|---|
| | Example I | | | | | Example II | | | |
| Run No. 1394-, (1466-).. | 57 | 58 | 60a | 60b | 60c | (2) | (3a) | (3b) | (4) |
| Conditions: | | | | | | | | | |
| Temperature, °F. | 1,000 | 1,004 | 1,002 | 1,003 | 999 | 1,002 | 1,004 | 1,002 | 1,003 |
| WHSV | .30 | .29 | .28 | .29 | .29 | .35 | .36 | .36 | .31 |
| Pressure, mm. of Hg. | 76 | 77 | 75 | 76 | 77 | 76 | 74 | 75 | 77 |
| Length of run, min. | 30 | 30 | 0-15 | 15-30 | 30-45 | 30 | 0-15 | 15-30 | 30 |
| Material balance, wt. percent | 100.4 | 94.6 | 101.1 | 95.7 | 99.7 | 100.6 | 95.0 | 100.1 | 96.7 |
| Yield, wt. percent on feed: | | | | | | | | | |
| $H_2$ | 1.06 | .87 | .71 | .72 | 1.50 | 1.77 | 3.24 | 2.16 | 1.88 |
| $C_1$ | .49 | .45 | .51 | .37 | .55 | 1.74 | 2.28 | 1.40 | 1.05 |
| $C_2$ | 1.03 | 1.10 | 1.59 | 1.19 | 1.21 | 1.84 | 2.00 | 2.56 | 1.44 |
| $C_3$ | .13 | .09 | .11 | .08 | .13 | .66 | .87 | .41 | .48 |
| $C_4$ | 3.77 | 3.77 | 4.12 | 3.43 | 3.74 | 4.88 | 4.83 | 4.25 | 4.13 |
| $C_5$ | .42 | 1.74 | .46 | .45 | .48 | 1.99 | 2.21 | 1.83 | 1.66 |
| 3,3-dimethylbutene-1 | 12.62 | 11.57 | 9.55 | 9.98 | 14.13 | 12.68 | 11.61 | 12.85 | 10.48 |
| 2,2-dimethylbutane | 76.67 | 75.63 | 80.08 | 80.62 | 74.47 | 54.60 | 53.00 | 57.84 | 67.16 |
| Other $C_6$ olefins and/or diolefins | 1.39 | 1.69 | .97 | 1.18 | 1.88 | 7.81 | 8.59 | 6.55 | 7.18 |
| Coke | 2.42 | 3.09 | 1.91 | 1.98 | 1.90 | 10.08 | 9.29 | 8.81 | 3.34 |
| Benzene | Tr. | Tr. | Tr. | Tr. | Tr. | 1.95 | 2.07 | 1.34 | 1.18 |
| Total conversion, wt. percent | 23.3 | 24.4 | 19.9 | 19.4 | 25.53 | 45.27 | 46.87 | 42.02 | 32.68 |
| Selectivity to neohexene, mole percent | 55.4 | 48.6 | 49.1 | 52.7 | 56.7 | 28.75 | 25.42 | 31.38 | 32.92 |

TABLE II
[Catalyst, Commercial Catalyst A; Feed, Pure Grade Neohexane]

| Run No. 1337 | 54 | 55 | 56 | 57 | 58 | 59 | 60 |
|---|---|---|---|---|---|---|---|
| Conditions: | | | | | | | |
| Temperature, °F | 974 | 978 | 983 | 975 | 1,058 | 1,050 | 1,016 |
| WHSV | .31 | .29 | .17 | .59 | .30 | .60 | .30 |
| Pressure, mm. of Hg | 76 | 75 | 75 | 84 | 75 | 89 | 76 |
| Length of run, min | 30 | 30 | 30 | 30 | 30 | 30 | 30 |
| Yield, wt. percent on feed: | | | | | | | |
| $H_2$ | .96 | .92 | .56 | .51 | 2.47 | 1.45 | 1.77 |
| $C_1$ | .67 | .65 | 2.08 | .34 | 2.34 | 1.24 | 1.38 |
| $C_2$ | .92 | .81 | 3.14 | .50 | 3.59 | 1.95 | 1.65 |
| $C_3$ | .19 | .15 | .48 | .08 | .45 | .22 | .30 |
| $C_4$ | 2.49 | 2.13 | 4.36 | 1.32 | 6.72 | 4.00 | 3.24 |
| $C_5$ | 1.61 | 1.35 | 1.57 | 1.10 | 2.72 | 2.33 | 2.04 |
| 3,3-dimethylbutene-1 | 9.92 | 9.94 | 9.62 | 8.16 | 10.19 | 9.95 | 11.11 |
| 2,2-dimethylbutane | 77.38 | 76.72 | 67.37 | 83.05 | 55.83 | 69.33 | 65.67 |
| Other $C_6$ olefins and/or diolefins plus benzene | 4.36 | 5.16 | 7.08 | 3.85 | 7.02 | 4.87 | 6.33 |
| Coke | 1.54 | 2.17 | 3.76 | 1.09 | 8.69 | 4.66 | 6.38 |
| Total conversion, wt. percent | 22.62 | 23.28 | 32.63 | 16.95 | 44.17 | 30.67 | 34.33 |
| Selectivity to neohexene, mole percent | 44.90 | 43.72 | 30.18 | 49.29 | 23.62 | 33.25 | 33.13 |

The data of tables I and II show the following: Runs 1394–57 and 58 show a 7–12 percent selectivity advantage for the spinel form of the zinc-aluminum-chromium-alkali metal oxide catalyst as compared with commercial Catalyst A, and an even greater selectivity advantage is demonstrated for the spinel form versus the zinc oxide form of the catalyst of the present invention. Runs 1394–60a–b–c are particularly interesting because they illustrate that the catalyst shows an improvement in selectivity with time on stream. The selectivity during the first 15 minutes was 1.4 percent less than the Commercial Catalyst A (this is within experimental error); but after 45 minutes on stream, catalyst selectivity was considerably higher than Catalyst A. Catalyst A, as well as most commercial paraffin dehydrogenation catalysts, has a useful life of 15–30 minutes before the coke on the catalyst reduces its performance to an unacceptable level. Run 1394–60 was continued for 30 more minutes during which time the catalyst performance to an unacceptable level. Run 1394–60 was continued for 30 more minutes during which time the catalyst performance continued to improve.

It is claimed:

1. The method of dehydrogenating an aliphatic, saturated or mono-olefinically unsaturated branched chain hydrocarbon of five to 10 carbon atoms, the longest continuous carbon-to-carbon chain of which contains four or five carbon atoms, to yield an aliphatic olefin having the same skeletal carbon atom arrangement as the hydrocarbon being dehydrogenated, which consists essentially of contacting said hydrocarbon under vapor phase dehydrogenation conditions, including a temperature of about 900° to 1250° F., with a catalyst composition consisting essentially of about 1 to 40 percent chromia, calculated as $Cr_2O_3$; sufficient zinc aluminate spinel to provide about 5 to 40 percent zinc, calculated as the free metal; and about 0.2 to 4 percent sodium oxide, calculated as the free metal, or an equimolar amount of another alkali metal oxide; said percentages being based on the weight of the catalyst composition.

2. The method of claim 1 wherein the aliphatic hydrocarbon.

3. The method of claim 2 wherein the chromia is present in amounts of about 5 to 40 percent and the zinc aluminate spinel is present in amounts sufficient to provide about 10 to 32 percent zinc.

4. The method of claim 2 wherein the aliphatic hydrocarbon being dehydrogenated has five to eight carbon atoms.

5. The method of claim 4, wherein the aliphatic hydrocarbon being dehydrogenated contains a quaternary carbon atom.

6. The method of claim 4 wherein the aliphatic hydrocarbon being dehydrogenated is neohexane and the dehydrogenation product is neohexene.

7. The method of claim 5 wherein the chromia is present in amounts of about 10 to 30 percent; the zinc aluminate spinel is present in amounts sufficient to provide about 10 to 32 percent zinc, and the alkali metal oxide is sodium oxide.

8. The method of dehydrogenating an aliphatic, saturated, branched chain hydrocarbon of five to eight carbon atoms, the longest continuous carbon-to-carbon chain of which contains four to five carbon atoms, to yield an aliphatic olefin having the same skeletal carbon atoms arrangement as the hydrocarbon being dehydrogenated, which consists essentially of contacting said hydrocarbon under vapor phase dehydrogenation conditions, including a temperature of about 925° to 1050° F., a hydrocarbon pressure of about 0.1 to 0.5 atmosphere and a weight hourly space velocity of about 0.1 to 5, with a catalyst composition consisting essentially of about 10 to 30 percent chromia, calculated as $Cr_2O_3$; sufficient zinc aluminate spinel to provide about 10 to 32 percent zinc, calculated as the free metal; and about 0.27 to 4.4 percent sodium oxide, calculated as $Na_2O$; said percentages being based on the weight of the catalyst composition.

9. The method of claim 8 wherein the aliphatic hydrocarbon being dehydrogenated contains a quaternary carbon atoms.

10. The method of claim 8 wherein the aliphatic hydrocarbon being dehydrogenated is neohexane and the dehydrogenation product is neohexene.

* * * * *

UNITED STATES PATENT OFFICE
CERTIFICATE OF CORRECTION

Patent No. 3,626,021          Dated December 7, 1971

Inventor(s) Glenn O. Michaels; John Mooi; LaVern H. Beckberger

It is certified that error appears in the above-identified patent and that said Letters Patent are hereby corrected as shown below:

Column 1, Line 54, reads "5 to 50%" should read —5 to 40%—

Column 2, delete Line 37 which reads "catalyst composition are added to the base, the resulting"

Column 4, Line 10, reads "EXAMPLE II L" should read —EXAMPLE II—

Column 4, Line 15, reads "Al(NO$_3$)39H$_2$O" should read —Al(NO$_3$)$_3$.9H$_2$O—

Column 4, Line 41, reads "(900-947-)" should read —(900-947-5086)—

Column 5, Lines 37-9, reads "performance to an unacceptable level. Run 1394-60 was continued for 30 more minutes during which time the catalyst performance continued to improve." should read only —performance continued to improve.—

Column 5, Line 59, add to Claim 2 —being dehydrogenated is a saturated hydrocarbon.—

Signed and sealed this 2nd day of May 1972.

(SEAL)
Attest:

EDWARD M. FLETCHER, JR.          ROBERT GOTTSCHALK
Attesting Officer          Commissioner of Patents